(12) United States Patent
Chawla et al.

(10) Patent No.: US 11,188,366 B2
(45) Date of Patent: *Nov. 30, 2021

(54) INDEPENDENT ACCESS TO VIRTUAL MACHINE DESKTOP CONTENT

(71) Applicant: VMware, Inc., Palo Alto, CA (US)

(72) Inventors: Puneet Chawla, Sunnyvale, CA (US); Jad Chamcham, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,954

(22) Filed: Jan. 4, 2018

(65) Prior Publication Data

US 2018/0143845 A1    May 24, 2018

Related U.S. Application Data

(63) Continuation of application No. 15/056,746, filed on Feb. 29, 2016, now Pat. No. 9,864,625, which is a
(Continued)

(51) Int. Cl.
*G06F 9/455* (2018.01)
*G06F 16/182* (2019.01)
*G06F 21/62* (2013.01)

(52) U.S. Cl.
CPC ...... *G06F 9/45558* (2013.01); *G06F 9/45533* (2013.01); *G06F 16/182* (2019.01);
(Continued)

(58) Field of Classification Search
CPC .... G06F 3/0607; G06F 3/0664; G06F 3/0676; G06F 17/30067; G06F 11/14;
(Continued)

(56) References Cited

U.S. PATENT DOCUMENTS

| 4,467,421 A | 8/1984 | White |
|---|---|---|
| 7,117,243 B2 | 10/2006 | Peart |

(Continued)

FOREIGN PATENT DOCUMENTS

| JP | 08-212187 | 8/1996 |
|---|---|---|
| JP | 2006-081159 | 3/2006 |

(Continued)

OTHER PUBLICATIONS

U.S. Appl. No. 12/694,383, filed Jan. 27, 2010.
(Continued)

*Primary Examiner* — Albert M Phillips, III
*Assistant Examiner* — Fatima P Mina
(74) *Attorney, Agent, or Firm* — Fish & Richardson P.C.

(57) ABSTRACT

Methods, systems, and techniques for facilitating access to content stored remotely, for example, as part of a virtual machine infrastructure or elsewhere in a networked environment, using a uniform mechanism are provided. Example embodiments provide an Enhanced Virtual Desktop Management Server/System with a Content Abstraction Layer which enables users to access their data stored as part of a virtual machine environment, or replicated otherwise on a network, using a generic API. The API can be incorporated into a web browser or other third party interface to provide access to the users' data without needing to remote a bitmap representation of a virtual desktop display. Accordingly, users can access their data, applications, and settings regardless of the type of access device and regardless of whether the corresponding virtual desktop is running in the data center, provisioned in the datacenter but running on a client device, or not running at all.

20 Claims, 10 Drawing Sheets

Related U.S. Application Data continuation of application No. 12/694,358, filed on Jan. 27, 2010, now Pat. No. 9,274,821.

(52) U.S. Cl.
CPC .................. *G06F 21/6218* (2013.01); *G06F 2009/45591* (2013.01); *G06F 2009/45595* (2013.01)

(58) Field of Classification Search
CPC ............. G06F 11/1469; G06F 11/3688; G06F 2201/84; G06F 2209/5022; G06F 2221/034; G06F 2221/2111; G06F 3/0484; G06F 16/285; G06F 16/5866; G06F 9/45558; G06F 16/182; G06F 21/6218; G06F 9/45533; G06F 2009/45591; G06F 2009/45595; G06Q 30/02; G06Q 30/0255; G06Q 30/0276; G06N 3/0454
See application file for complete search history.

(56) References Cited

U.S. PATENT DOCUMENTS

| | | | |
|---|---|---|---|
| 7,181,578 B1 | 2/2007 | Guha | |
| 7,184,764 B2 | 2/2007 | Raviv et al. | |
| 7,325,040 B2 | 1/2008 | Truong | |
| 7,606,868 B1 | 10/2009 | Le et al. | |
| 7,669,020 B1 | 2/2010 | Shah et al. | |
| 7,941,470 B2 | 5/2011 | Le et al. | |
| 8,011,010 B2* | 8/2011 | Michael | G06F 21/562 726/22 |
| 8,027,354 B1 | 9/2011 | Portolani | |
| 8,112,748 B2 | 2/2012 | Pomerantz | |
| 8,234,236 B2 | 7/2012 | Beaty | |
| 8,261,268 B1 | 9/2012 | Forgette | |
| 8,266,311 B2 | 9/2012 | Virdi et al. | |
| 8,271,528 B1 | 9/2012 | Wilkinson et al. | |
| 8,356,084 B2 | 1/2013 | Yamamoto | |
| 8,433,802 B2 | 4/2013 | Head et al. | |
| 8,555,274 B1 | 10/2013 | Chawla et al. | |
| 8,776,050 B2 | 7/2014 | Plouffe | |
| 9,009,219 B2 | 4/2015 | Chawla et al. | |
| 9,274,821 B2 | 3/2016 | Chawla et al. | |
| 9,477,531 B2 | 10/2016 | Chawla et al. | |
| 9,864,625 B2 | 1/2018 | Chawla et al. | |
| 2002/0091697 A1 | 7/2002 | Huang | |
| 2003/0195950 A1 | 10/2003 | Huang et al. | |
| 2006/0080397 A1 | 4/2006 | Chene et al. | |
| 2006/0136389 A1 | 6/2006 | Cover | |
| 2007/0043860 A1 | 2/2007 | Pabari | |
| 2007/0124406 A1 | 5/2007 | Liu et al. | |
| 2007/0174410 A1 | 7/2007 | Croft et al. | |
| 2007/0180493 A1* | 8/2007 | Croft | G06F 3/1415 726/2 |
| 2007/0186212 A1 | 8/2007 | Mazzaferri et al. | |
| 2007/0192329 A1 | 8/2007 | Croft et al. | |
| 2007/0198656 A1 | 8/2007 | Mazzaferri et al. | |
| 2007/0204011 A1 | 8/2007 | Shaver et al. | |
| 2007/0234334 A1* | 10/2007 | Araujo, Jr. | G06F 9/45558 717/168 |
| 2007/0260702 A1 | 11/2007 | Richardson et al. | |
| 2007/0288599 A1 | 12/2007 | Saul | |
| 2008/0034071 A1 | 2/2008 | Wilkinson et al. | |
| 2008/0104590 A1* | 5/2008 | McCrory | G06F 9/45558 718/1 |
| 2008/0201414 A1 | 8/2008 | Husain et al. | |
| 2008/0201479 A1* | 8/2008 | Husain | G06F 9/445 709/227 |
| 2008/0250424 A1 | 10/2008 | Brugiolo et al. | |
| 2008/0281798 A1 | 11/2008 | Chatterjee et al. | |
| 2008/0320583 A1 | 12/2008 | Sharma et al. | |
| 2009/0006537 A1 | 1/2009 | Palekar et al. | |
| 2009/0094523 A1 | 4/2009 | Treder et al. | |
| 2009/0170604 A1 | 7/2009 | Mueller et al. | |
| 2009/0216975 A1 | 8/2009 | Halperin et al. | |
| 2009/0235358 A1* | 9/2009 | Tolba | G06F 3/0607 726/24 |
| 2009/0240904 A1 | 9/2009 | Austruy et al. | |
| 2010/0070870 A1 | 3/2010 | Halperin et al. | |
| 2010/0070978 A1 | 3/2010 | Chawla et al. | |
| 2010/0114867 A1 | 5/2010 | Olsten | |
| 2010/0131654 A1 | 5/2010 | Malakapalli et al. | |
| 2010/0131949 A1 | 5/2010 | Ferris | |
| 2010/0191783 A1 | 7/2010 | Mason et al. | |
| 2010/0199276 A1 | 8/2010 | Umbehocker | |
| 2010/0211944 A1 | 8/2010 | Kaneda | |
| 2010/0268813 A1 | 10/2010 | Pahlavan et al. | |
| 2010/0269152 A1 | 10/2010 | Pahlavan et al. | |
| 2010/0274784 A1 | 10/2010 | Acharya | |
| 2010/0325258 A1 | 12/2010 | Carpenter et al. | |
| 2011/0004680 A1* | 1/2011 | Ryman | H04L 67/025 709/224 |
| 2011/0066668 A1 | 3/2011 | Guarraci | |
| 2011/0099297 A1 | 4/2011 | Hayyon | |
| 2011/0099497 A1 | 4/2011 | Fok | |
| 2011/0119668 A1 | 5/2011 | Calder et al. | |
| 2011/0153716 A1 | 6/2011 | Malakapalli et al. | |
| 2011/0184993 A1 | 7/2011 | Chawla | |
| 2011/0185292 A1 | 7/2011 | Chawla et al. | |
| 2011/0185355 A1 | 7/2011 | Chawla et al. | |
| 2011/0202583 A1 | 8/2011 | Provencher et al. | |
| 2011/0209064 A1 | 8/2011 | Jorgensen et al. | |
| 2011/0276699 A1 | 11/2011 | Pedersen | |
| 2012/0226742 A1 | 9/2012 | Monnchilov | |
| 2013/0018939 A1 | 1/2013 | Chawla et al. | |
| 2016/0014216 A1 | 1/2016 | Chawla et al. | |
| 2016/0179566 A1 | 6/2016 | Chawla et al. | |

FOREIGN PATENT DOCUMENTS

| | | |
|---|---|---|
| JP | 2008-511931 | 4/2008 |
| JP | 2009-230253 | 10/2009 |

OTHER PUBLICATIONS

Puneet Singh Chawla et al., U.S. Appl. No. 13/217,484 entitled, "Native Viewer Use for Service Results From A Remote Desktop" filed Aug. 25, 2011.
U.S. Appl. No. 12/694,358, filed Jan. 27, 2010.
European Patent Office; International Search Report and Written Opinion for PCT/US2010/046377; dated Jan. 30, 2013; 11 pages.
First Office Action issued in Australian Patent Application No. 2012284345, dated Feb. 18, 2015. 3 pages.
Japanese Office Action received in Japanese Patent Application No. 2014-520299, dated Dec. 1, 2015. 6 Pages.
John McBride et al., Project GoldenGate » XenApp—Citrix Community, http://community.citrix.com/display/xa/Project+GoldenGate, Jul. 1, 2011.
Quickoffice, Inc.; QuickOffice Pro for iPhone and iPod Touch, Version 4.0.0, User Help Guide; Jan. 1, 2010; 42 pages.
Tedd Foxx, Citrix Receiver» XenApp—Citrix Community, http://community.citrix.com/display/xa/Citrix+Receiver, Aug. 13, 2010.

* cited by examiner

INDEPENDENT ACCESS TO VIRTUAL MACHINE DESKTOP CONTENT

CROSS-NOTING TO RELATED APPLICATIONS

This application is a continuation of U.S. application Ser. No. 15/056,746, filed Feb. 29, 2016, now U.S. Pat. No. 9,864,625, which is a continuation of U.S. application Ser. No. 12/694,358, filed Jan. 27, 2010, now U.S. Pat. No. 9,274,821, each of which is incorporated herein by reference in its entirety.

BACKGROUND

The benefits of computer virtualization have been recognized as greatly increasing the computational efficiency and flexibility of a computing hardware platform. For example, computer virtualization allows multiple virtual computing machines (VMs) (or "guests") to run on a common computing hardware platform (referred to as a "host") even when the software components, such as the guest operating systems of each virtual machine, differ. Similar to a physical computing hardware platform, virtual computing machines include storage media, such as virtual hard disks, virtual processors, guest physical memory, virtual devices, and other system components associated with a computing environment. In a typical virtualized machine architecture, a virtual hard disk stores a guest operating system, data, and application files for a virtual machine. Virtualization software receives disk read and write requests from guest software running on the virtual machine and maps the requests to a disk image file containing an image of the virtual disk on a datastore accessible by the host. The disk image file is block-based, and contains file segments that map to disk blocks of the virtual disk. Thus, when the virtual machine reads a particular disk block, that request is mapped to a read of the corresponding segment of the disk image file, the contents of which are supplied to the virtual machine in a manner consistent with an ordinary disk read.

Server-based computing, such as available using computer virtualization architectures, allows a networked client computing system, remotely situated with respect to a server computing system, to access computing resources on the server. For example, a client computing system can use a remote desktop protocol such as Remote Desktop Protocol (RDP) Virtual Network Computing (VNC), or PCoIP to access a desktop remotely. A virtual desktop is a virtual computing system that operates as a desktop or workstation computer that an end user can interact with using the remote desktop protocol and client software and/or hardware. The client software and/or hardware transmits user input such as keyboard or mouse input to the remote system to be processed there, and receives display and other data, such as sound, for presentation to the user.

Server-based computing facilitates centralized management of computing resources. However, one drawback is that the user must have the client system remain connected to the network while accessing to the user's desktop stored on the server.

As an alternative to server-based computing, client-side computing allows the user to be located away from an enterprise network and in offline mode, i.e., not connected to a network or the Internet. From an enterprise management standpoint, however, client-side computing leads to undesirable inefficiencies when it comes to such tasks as updating operating systems and applications, enforcing security, licensing compliance, locking information, forcing adherence to various enterprise or corporate policies, and data backup.

Some of the challenges described above have been addressed by extending the server-based desktop-virtual machine architecture to a client machine by allowing a user to "check out" a virtual desktop such that it can be accessed on the client machine while offline. At the time of check out, a copy of the virtual disk of the user's virtual desktop is instantiated on the client machine and accessed by a (new) virtual machine started on the client system. The user is then able to access his or her virtual desktop without being connected to a network. Later, upon "check in," the changes to the virtual disk are synchronized to the virtual disk maintained in the server system.

Others have addressed the above challenges by running a virtual desktop in the datacenter (on the server system) and, using a "thin" (display only) client, to cause the server system to stream down only needed portions of the virtual disk upon each access (for example, using a limited cache).

In all these cases, the actual desktop virtual disk image is provisioned, maintained, and/or monitored in the datacenter. Accordingly, all of the user content stored on the virtual disks by a virtual desktop is also maintained by the virtual computing infrastructure executing on the servers. To access the data, a user must start a virtual desktop, load or otherwise gain access to the data to perform desired functions, and then exit the virtual desktop.

In recent years, the computing experience has changed due to the wide spectrum of devices are capable of running the Internet on handheld devices. Different form factors, capacities, permissions, etc., make the delivery and running virtual desktops difficult on these devices.

DETAILED DESCRIPTION

Figure 1:
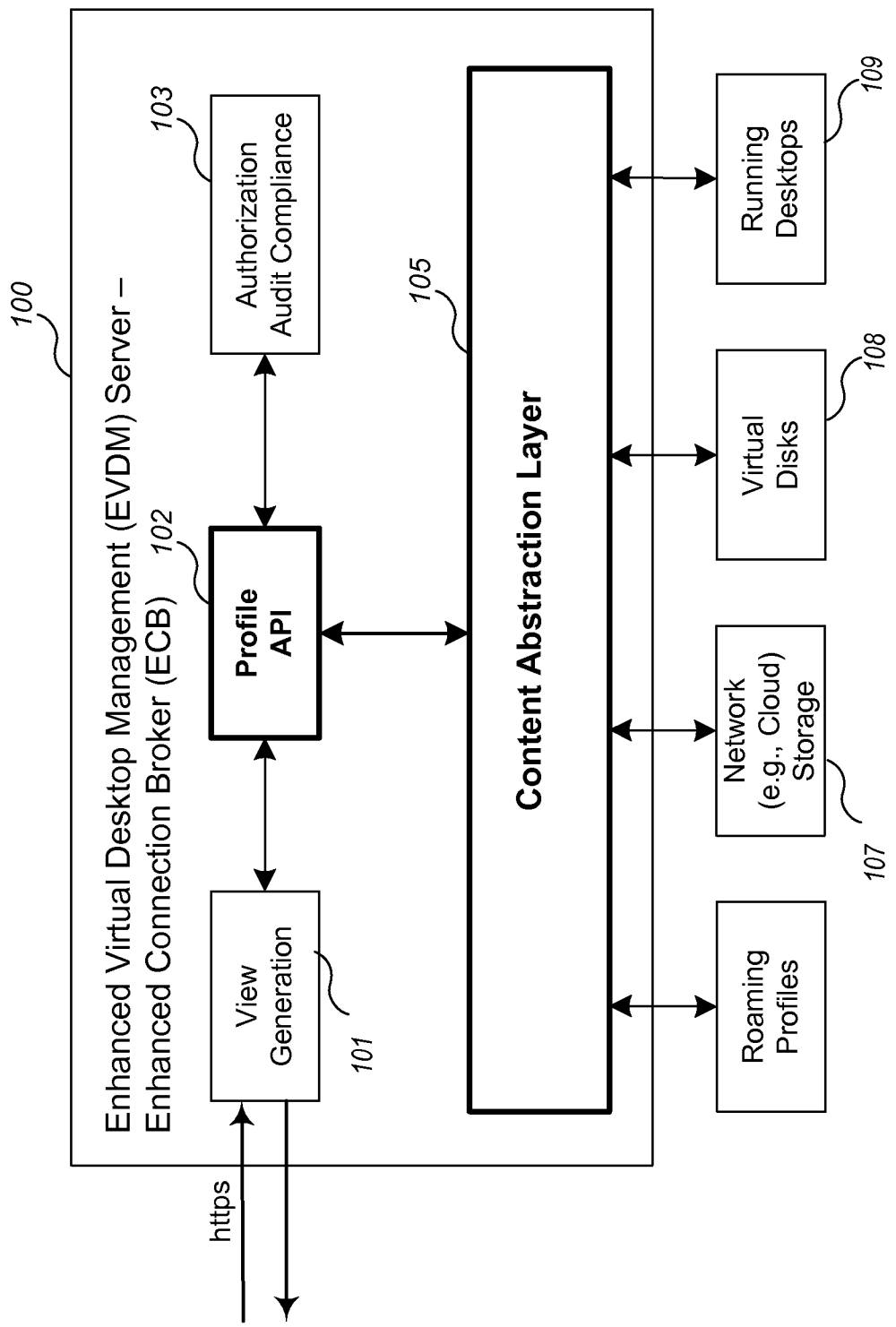
FIG. 1 is an example block diagram overview of the interactions of an example Enhanced Virtual Desktop Management Server to provide uniform access to remote virtual desktop content.

Embodiments described herein provide enhanced computer- and network-based method, systems, and techniques for providing access to content stored remotely, for example, as part of a virtual machine infrastructure or elsewhere in a networked environment, using a single mechanism that allows access to the data in the same way, potentially from many different form factor devices, regardless of whether the data is stored as part of a running or offline virtual machine. Example embodiments provide an Enhanced Virtual Desktop Management ("EVDM") Server/System, which enables users to access their data, applications, and/or settings, stored as part of a virtual machine environment or replicated otherwise on a network, using a generic application programming interface ("API"). Data, applications, and/or settings, as they are stored in files, for example on a virtual data disk, will be referred to as just "data" unless otherwise indicated. The data for a particular user (e.g., the user's personal files, settings, etc.) constitutes the user's User Profile. The API can be incorporated into a web browser or other third party interface to provide access to the users' data without needing to remote a bitmap representation of a virtual desktop display (e.g., of the virtual desktop running in a datacenter) or other computational heavy aspects of a virtual machine environment. Accordingly, users can access their data, applications, and settings stored in a datacenter, or in other remote networked locations such as cloud storage, regardless of the type of access device used to obtain the data, and regardless of whether the corresponding desktop is running in the data center, provisioned in the datacenter but running on a client device, or not running at all, as long as the device has access to the corresponding storage network (e.g., the Internet) long enough to download the data.

In overview, the Enhanced Virtual Desktop Management (EVDM) Server, or EVDM System running on a server computing system, implements the API using an API handler which forwards permissible and authorized input requests to a Content Abstraction Layer ("CAL"). The Content Abstraction Layer is responsible for the process of actually obtaining the data, including knowing the source location of the data, so that the requestor can request a file the same way regardless of where or how it is stored and regardless of whether it contains applications, user data, and/or settings, etc. The Content Abstraction Layer determines the source of the requested data, connects as appropriate to components needed to acquire the requested data, even if they reside in an offline virtual machine remotely stored as part of a virtualization infrastructure, and delivers the data back to the requester on behalf of the EVDM Server. To assist the Content Abstraction Layer, a special virtual machine called a "Control VM" is provided to access data stored remotely in a non-running virtual machine. The Control VM can mount or otherwise access data disks on the fly to access requested files. In addition, special identity management support and policies are defined that are specific to a user's right to access stored data.

FIG. 1 is an example block diagram overview of the interactions of an example Enhanced Virtual Desktop Management Server to provide uniform access to remote virtual desktop content. An Enhanced Virtual Desktop Management Server, through its Enhanced Connection Broker (ECB) 100, receives a request for data in the form of call (e.g., a method, procedure, function call, invocation, etc . . . ) to an API, potentially through a web browser interface requesting view generation 101. Examples of such calls are primitives to view file content, get file metadata, download/upload file, etc. The request to the Profile API 102, gets authorization 103 for the requesting user and/or audits the request for compliance with a set of policies, and forwards appropriate instructions, as defined by the particular API implementation, to a Content Abstraction Layer 105. Profile API 102 is called such to reflect operations on user profiles—the data, applications, and settings associated with a user.

The Content Abstraction Layer 105, as will be described in detail below, interacts with appropriate virtualization system components (not shown) to retrieve the requested data from the appropriate data source, while hiding the details about the actual source of the data from the requester. The requested data (e.g., user data, applications, and/or setup) may be data stored on different back-ends: that is, data that is part of a (virtual disk) of a running virtual desktop 109; data that is stored on a virtual disk 108 (e.g., a disk image stored according to a format such as vmdk provided by VMWARE®, Inc.) associated with a virtual machine that is not running or not associated with a user at all; data stored elsewhere on the network 107 (for example, replicated to a remote storage facility such as "cloud" storage that is scalable, fast, inexpensive data storage provided by AMAZAON® (S3), RACKSPACE® (Mosso), EMC® (Atmos®), YAHOO! (MObStor), or as a private datacenter on-premise deployment, using, for example offerings from Parascale, Mezeo, etc.); or profile data available through other interfaces and centrally managed on a shared storage using MICROSOFT® profile based technologies, for example, roaming profiles, smart profile technologies from companies like RTO Software, APPSENSE®, RES Software, Citrix etc. Roaming profiles are profile data that allow users to log on to different computers within a same Windows server domain and maintain access to their local files and configuration settings. In addition to these backend stores, virtualized applications can be optionally stored on a shared file system accessible from the Enhanced Connection Broker on the EVDM Server. Other remote data interfaces may be similarly supported by the Profile API 102 within an EVDM Server 100.

Once the appropriate data is retrieved (as needed to respond to the Profile API 102 request), a view of the results 101 is generated, as needed, and returned to the requester. Of note, in some scenarios, for example, when the API is called directly by a $3^{rd}$ party application, no view generation may be performed.

The techniques of an EVDM Server for abstracting out data access are especially useful to client devices having limited computing resources and/or small form factors, such as smartphones, personal data access devices, travel laptops, etc. For example, using the exemplary techniques for providing uniform access to remote content ("UARC" techniques), a user using a small handheld smartphone can view documents stored in a datacenter and open them using local applications especially formulated to display contents on that form factor device. In addition, certain applications, such as Windows-based applications running on Windows-based client devices, can be downloaded to the client device as simple files and executed locally, with or without downloading other portions of the VM environment.

Thus, using UARC techniques, the Enhanced Virtual Desktop Management Server is able to provide universal access to content owned, or otherwise permissible to be accessed, by users—even if the content is stored in a datacenter as part of virtual machines. In addition, UARC techniques separate the notion of access to data from access to applications and other portions of the virtual infrastructure, so that users can gain access to their data without needing to execute the complete (virtual machine) computing container. The virtual desktop is no longer only accessible as a complete "bubble" or virtual machine; different components of the desktop, such as the applications and the user profile portion of the desktop, can be made accessible separately from each other and separate from the other user data. In this manner, the EVDM Server can provide "partial access" to virtual desktops.

In addition, the uniform access to remote content techniques and Enhanced Virtual Desktop Management Server may be useful to access a variety of other types of data and from other source locations, even if they are not explicitly mentioned herein. Also, although certain terms are used primarily herein, other terms could be used interchangeably to yield equivalent embodiments and examples. For example, it is well-known that equivalent terms in the virtualization field and in other similar fields could be substituted for such terms as "hypervisor," VMMS, etc. In addition, terms may have alternate spellings which may or may not be explicitly mentioned, and all such variations of terms are intended to be included.

Example embodiments described herein provide applications, tools, data structures and other support to implement an Enhanced Virtual Desktop Management Server/System to be used to implement uniform access to remote virtual desktop content. Other embodiments of the described techniques may be used for other purposes, including, for example, for file sharing applications, social network and other collaborative applications, ECM (enterprise content management) applications, etc. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 2:
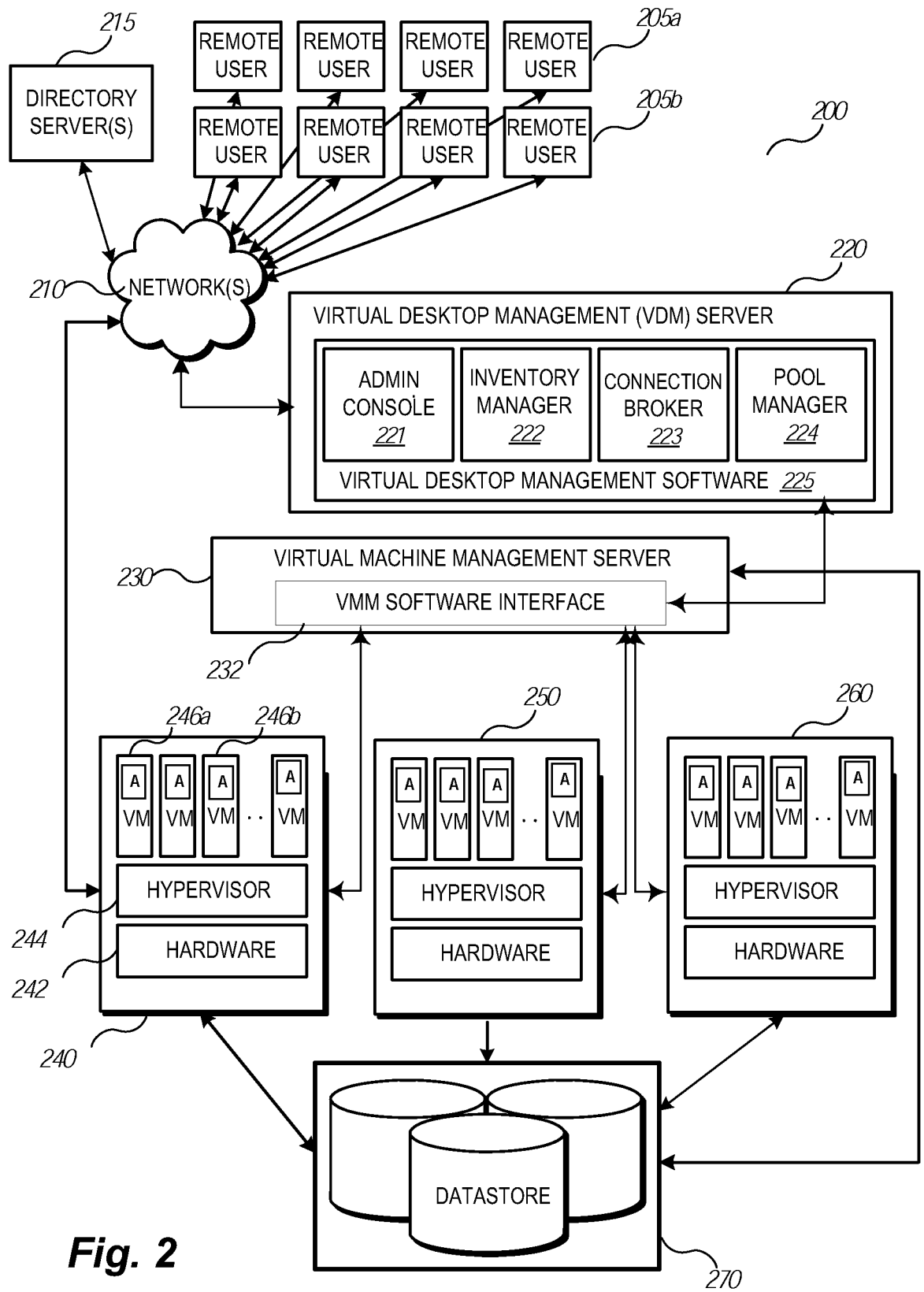
FIG. 2 is a block diagram of an example general virtualized machine architecture environment for executing example embodiments of an example Enhanced Virtual Desktop Management Server.

FIG. 2 is a block diagram of an example general virtualized machine architecture environment for executing example embodiments of an example Enhanced Virtual Desktop Management Server. As shown in FIG. 2, in traditional use, remote users, for example users 205a and 205b may access centrally-managed user desktops, such as those implemented by virtual machines running in a datacenter, using network 210 (e.g., a local area network, or other private or publically accessible wide area network, such as the Internet) through any number of different types of devices. These virtual machines (VMs) are complete computation environments, containing virtual equivalents of the hardware and system software components of a physical system as described above, and are typically implemented by an extensive virtualization infrastructure, which includes a variety of software and hardware components.

The term "desktop," refers to a human interface environment through which users can launch, interact with, and manage applications, settings, and/or data, etc. Virtualized desktops may export user interfaces, e.g., keyboard and mouse input, audio and visual output, to the user from virtual machines running remotely (in the datacenter) or locally on the client, or, in some cases, using a hybrid. In the case of virtualization environments, the client side of the "desktop" typically includes a bitmap representation of the desktop running—wherever it is being run. Input to and output from the virtualized desktop are reflected in the bitmap representation on the client as it occurs on the virtualized desktop.

Remote access to virtualized desktops is generally provided to client devices through a Virtual Desktop Management (VDM) Server 220. The VDM Server 220 provides "virtual desktops" to the remote user devices, and manages the corresponding virtual machines through communications with a software interface 232 of a Virtual Machine Management Server (VMMS) 230. The Virtual Machine Management Server (VMMS) 230 is responsible for provisioning and maintaining the multitude of Virtual Machines (VMs) implemented across potentially a multitude of physical computers, such as computer 240, 250, and 260. When a user wishes to access an existing virtual machine, the user establishes a connection through the VDM Server 220, and a virtual desktop is presented (as a user interface) on the user's client device, through which communications are made with the underlying virtual machine.

In the example embodiment shown, as implemented for example, by VMware Inc.'s virtualization infrastructure architecture 200, each physical computer, for example computer 240 contains the underlying hardware 242, virtualization software (here a hypervisor 244), and one or more virtual machines, for example VM 246a and VM 246b, which each contain Agent Software (guest system software) labeled here as "A" in each VM box. The Agent Software is typically responsible for connecting each VM to the VDM Server 220 and manages each desktop connection. It typically notifies the VDM Server 220 upon each login, logoff, and disconnect. The Agent Software also provides support for remote devices such as USB devices, etc.

The VMMS 230 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hyperviser 244 running on physical computer 240. The hypervisor manages physical resources as well as maintains virtual-to-physical hardware mappings. While some VMMS specialize in virtual machine management, such as VMware's VirtualCenter, Microsoft's Virtual Machine Manager, Citrix's XenCenter, others can manage both physical and virtual computers, such as IBM's Director, HP's OpenView and Microsoft's System Center Suite.

The Software Interface 232 running on the VMMS 230 communicates with these hypervisors (e.g., hypervisor 244) to provision and manage each VM. For example, according to traditional virtualization techniques, when a remote user (e.g., user 205a) requests access to a particular existing desktop, the VDM Server 220 (through its software 225), communicates with the VMMS through its software interface 232 to start the corresponding VM executing on an appropriate physical computer, and to relay the user interface exported by the VM to the remote user so that the user can interact with the desktop. In some instances (e.g., according to administrator policies), when the desktop is exited, or otherwise shutdown, the VDM Server 220 communicates with the VMMS 230 to save the VM image to the datastore 270 as appropriate and to de-allocate physical and VM system resources as needed.

In general, the VMMS Server 230 provides interfaces 232 to enable other programs, such as the Pool Manager 224, to control the lifecycle of the various virtual machines that run on a hypervisor. For example, it supports operations for
1) the discovery of compute, storage, and network resources;
2) creation of logical compute pools (as discussed below) by providing features such as automatic CPU and memory load balancing;
3) provisioning/creation of one or more virtual disks, on local or shared storage—clones with full or sparse disks;
4) creation of virtual machines anchored to a base virtual machine—for example, linked clones using REDO disks; and
5) power operations on virtual machines (power on, power-off, suspend, resume, checkpoint, etc), etc.

In one example embodiment of an existing virtualization infrastructure providing by VMWARE® Inc., a Virtual Desktop Management (VDM) Server 220 includes an Administrative Console 221, an Inventory Manager 222, a Connection Broker 223, and a Pool Manager 224. The Connection Broker 223, allows a remote user, such as remote user 205a, through a client device to select a type of virtualized desktop and initiate a desktop session or to access an existing connection to a virtualized desktop.

The Inventory Manager 222 maintains a mapping of different user belongings in the system. For example, user may be entitled to certain applications; may have access to more than one desktop, etc. The Inventory Manager 222 also keeps track of the running virtual desktops in the system. The mappings may be stored using any number of mechanisms, including using one or more directory servers 215 accessible through network 210.

The Pool Manager 224 component manages the complete lifecycle of virtual desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 230.

The software state of all the virtual machines in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

For example, a department of an offshore organization may include a plurality of data-entry clerks and a manager. The manager may be provided access to a private persistent VM, and the data-entry clerks may be provided access to a logical grouping of non-persistent VMs. The data-entry clerks may use any VM in the logical grouping to perform data entry, for example, in a database. However, because the VMs in the logical grouping are non-persistent, and are configured to discard session state every day, no changes made during a working session may be persisted in the VM. This ensures that the data-entry clerks obtain consistent desktops regardless of which VM in the logical grouping is being used, and provide an additional layer of security. However, because the manager has access to a persistent VM, changes to the desktop's software or documents may be made by the manager. For example, the manager may create files using an application like Microsoft Office, and store those files on the desktop executing in the persistent VM. When the manager connects to the desktop on subsequent attempts, all files and application software are available.

The Administrative Console 221 typically provides a user interface for a Desktop Administrator to manage the configuration of desktop pools, define user access policies, manage ongoing maintenance, software installed in the desktops, etc. For example, the Administrative Console 221 may permit the Desktop Administrator to: create desktop pools; associate desktop pools with a VMMS 230; provide other details such as the compute resources (hosts, clusters) needed to run the VMs, logical resource pools (e.g., VI DRS Resource Pools) for load balancing, type of memory sharing configuration (e.g., reserve memory for virtual machines or use memory overcommit), storage used to provision the VMs (identifying one or more datastores), guest customization details like a custom naming scheme for VMs in the pool (e.g., a "marketingxxxx" custom name such that the VMs in the pool are called marketing0001 to marketing9999), domain membership info (e.g., to add VM to domain vmware-vdi.com), etc.; associate a desktop pool with a master image or template; define VM state policies (keep VMs powered-on, suspend VM when user logs off, etc.); set up custom messages to be sent to end users when the desktops are put into maintenance mode (e.g., for weekly patches, hotfixes, etc.); and/or manage the application registration and load process.

The Directory Server 215 stores the persistent state required for managing the virtual desktops. For example, the VMs in a desktop pool maybe associated with one or more users. The user identifiers for a pool may be stored in the directory server 215. The users may also be referenced through an external directory server such as—Microsoft Active Directory, Novell eDirectory, IBM Tivoli Directory Server, etc. In one embodiment, the directory server 215 may contain state for:
1) Desktop Pools: details like the display name of the pool, e.g.,—marketing desktops, the number of desktops required in the pool, default power state of the pool (powered-on, suspended, configured to transition to low power states like ACPI S1/WoL, powered-off, etc), pool creation date, etc.;
2) Disk type for a virtual machine—full disk, sparse datastores for each desktop pool, etc.;
3) Disk replication using REDO disk approach, linked clone or synchronized clone, etc.;
4) Type of virtual disk to be stored on datastore—user data disk, OS disk, guest page file, vmkernel swap file, etc.;
5) Details of virtual machines created in the pools—unique computer name, identifier and inventory location in VMMS, unique reference identifier on VMMS, etc.;
6) Users: unique identifier for user accounts, external references to Active Directory Server, Novell eDirectory, etc.;
7) Entitlements: mappings between users, applications, and desktops;
8) Policies—indications of types of devices available, default monitor configurations (single, dual), screen resolution, etc.; and
9) Audit events—for example, lock out if three successive login attempts fail, time of access, type of access device, etc.

Examples and details of variants of virtualization architectures, such as that described with reference to FIG. 2, can be found in U.S. patent application Ser. No. 11/395,012, entitled Virtualized Desktop Allocation System Using Virtual Infrastructure, filed Mar. 31, 2006; U.S. patent application Ser. No. 12/058,269, entitled Synchronized Clones, filed Mar. 28, 2008; and in U.S. Patent Publication No. 2009/0216975, entitled Extending Server-Based Desktop Virtual Machine Architecture to Client Machines, filed Feb. 23, 2009.

In order to provide the uniform access to remote content ("UARC") techniques described herein, an Enhanced Virtual Desktop Management (EVDM) Server may be configured as detailed below. The EVDM Server may be deployed in place of the VDM Server 220 in a virtualization environment similar to that described with reference to FIG. 2. Most of the modifications to accomplish this enhanced method of accessing virtual desktop related data reside with the Connection Broker component; however, other adjustments have been made to the Inventory Manager, Pool Manager, and Administrative Console, etc. to account for the ability to access different content (not just entire virtual machines) potentially under different policy rules and at distributed locations.

First, the Connection Broker, which in the traditional virtual infrastructure is responsible for initiating and managing connections to virtual desktops, is enhanced to provide connection access at a different level of granularity—the data itself. In particular, it is the Enhanced Connection Broker of the Enhanced Virtual Desktop Management (EVDM) Server that provides the API handling and Content Abstraction Layer described with respect to FIG. 1.

Figure 3:
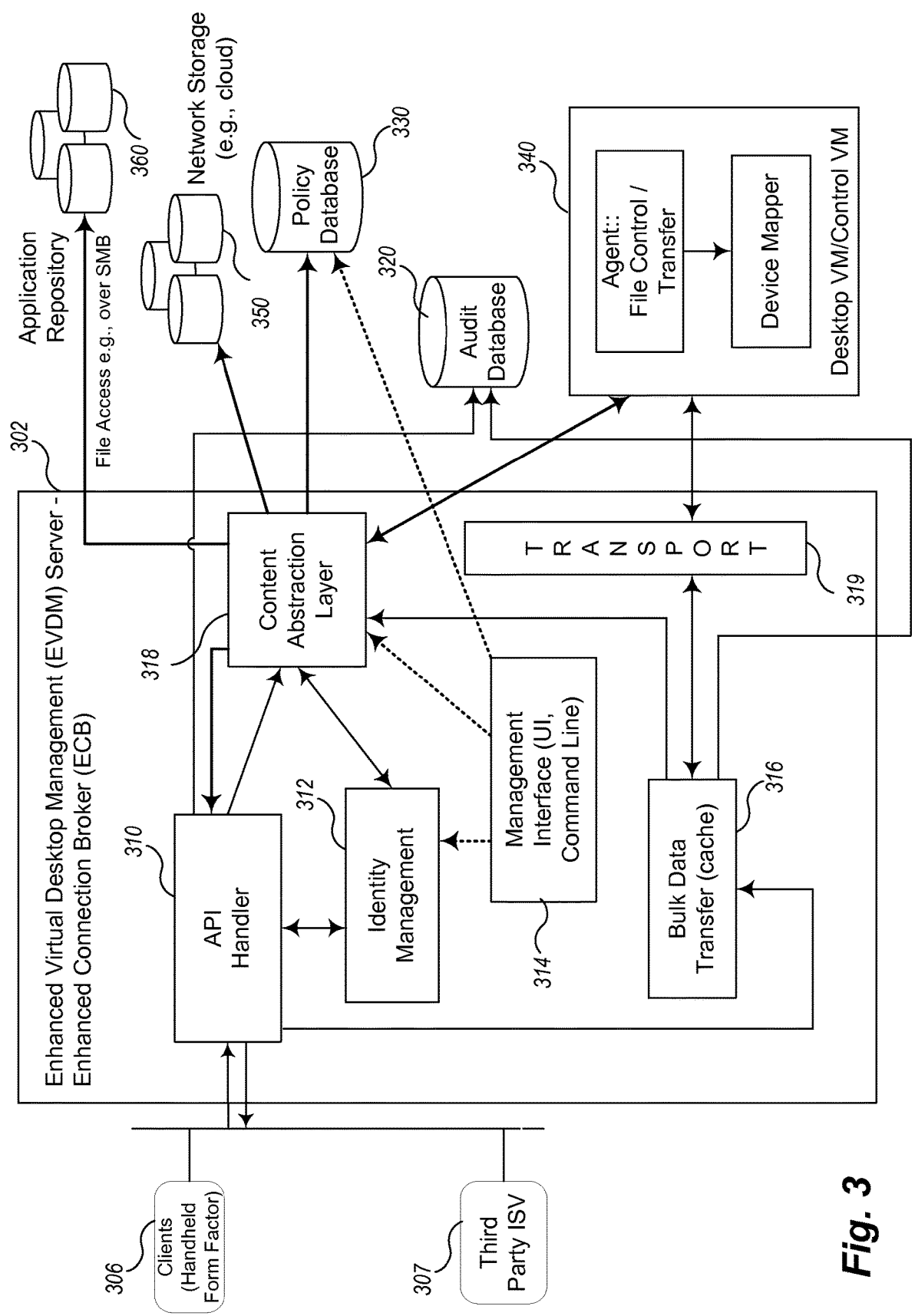
FIG. 3 is an example block diagram of components of an example Enhanced Connection Broker of an example Enhanced Virtual Desktop Management Server interacting to provide an example uniform access to remote content mechanism.

FIG. 3 is an example block diagram of components of an example Enhanced Connection Broker of an example Enhanced Virtual Desktop Management Server interacting to provide an example uniform access to remote content mechanism. The Enhanced Connection Broker 302 comprises an API Handler 310, an Identity Management component 312, a Management Interface 314, a Bulk Data Transfer mechanism 316, a Content Abstraction Layer 318, and a Transport mechanism 319 for communication with virtual machines. Clients, such as those with a handheld form factor 306, and third party independent software vendors (ISVs) 307 communicate with the ECB 302 through calls to the Profile API, as explained above with respect to FIG. 1. Each API call is handled by the API Handler 310, which consults with the Identity Management component 312 to validate the request (to determine whether the user is authorized to make the request); passes the request to the Bulk Data Transfer component 316 to perform the data transfer using a high speed (e.g., cached) path; or forwards the request as appropriate to the Content Abstraction Layer 318. Optionally, the API Handler 310 may record the transaction in the Audit Database 320 if audit capability has been implemented and enabled. The Content Abstraction Layer 318, as described in more detail below in an example relating to retrieving data from offline virtual machine disks, determines the location of the requested data and the mechanism needed to retrieve such data. In addition, the Content Abstraction Layer 318 consults the Policy Database 330 to first determine whether the user is authorized to access the requested content. The policies may be specific to the user, locations, times of day, etc. and may be defined by any type of mechanism that can be used to define such rules, including but not limited to a rules database, methods attached to user or content representative objects, a rules engine, etc. The Content Abstraction Layer 318 may access a Desktop VM or a Control VM 340 to access data associated with a virtual machine; network storage 350 to access data stored, for example, in cloud storage; and/or application repository 360 to retrieve applications as stored in files retrievable from such a repository. Details of the logic of the Content Abstraction Layer 318 as used to determine and retrieve the appropriate data are described below with respect to FIGS. 7A-7B. Once the requested user data is obtained, it is returned through the API Handler 310 to the appropriate (requestor) client device.

The Bulk Data Transfer component 316 is responsible for transferring data such as big files when the communications channel from the EVDM Server 302 to the client device (e.g. device 306 or 307) is slow. The Bulk Data Transfer component 316 obtains the data and then temporarily caches the data to be accessed by the client device. In some embodiments, a transport mechanism 319, such as a TCP socket, FTP connection, http upload/download, etc., may be provided as a fast communications channel to a Desktop VM (running desktop) or to a Control VM (once a connection to a non-running desktop has been initiated). Alternatively, the Bulk Data Transfer component 316 may communicate directly with the Desktop VM/Control VM 340 to obtain large amounts of data over a channel that is still in most cases faster than the connection from the EVDM Server 302 to the client device and to cache the data as part of the Bulk Transfer component 316. Data is return to the API Handler 310 at a rate appropriate to delivery to the client device.

The Management Interface component 314 may be invoked, for example, by a Desktop Administrator to set up policies for access to the user data. For example, policies (rules) may be stored in the policy database that are time-based (e.g., no access between 9-5, daily) or that are device-based (e.g., access only allowed from a Blackberry device later than model x). The Management Interface component 314 may also be invoked to facilitate the Content Abstraction Layer 318 to perform certain functions. For example, the Administrator may use the Management Interface component 314 to cause the CAL to index files so that search queries may be executed by a client device or to delete files or the virtual disk when an identified user leaves the company, etc.

Several API are supported by an example Enhanced Connection Broker, such as Enhanced Connection Broker 302 of FIG. 3. In one embodiment, the Profile API that are processed by the API Handler 310 of an example ECB 302 include:

listFiles(root)—list files for root folder ("root" as defined by administrator, e.g., "My Documents and Settings")
listFiles(Foldername)—list files in a folder
isFile(name)—is the current file a file?
isDirectory(name)—is the current file a directory?
getFileDetails(name)—get details of the file including filename, file path, file size, file last modified date, file creation date, etc.
downloadFile(name)
uploadFile(name)
canRead(name)—check if permissions allow read access canWrite(name)—check if permissions allow write access
getAllEntitledApps( )—find name of apps entitled to users Note: "name" could be absolute or relative.

Different techniques are used by a Content Abstraction Layer of an Enhanced Connection Broker such as CAL 318 in order to access content from the various scenarios, such as the virtual machines 340, the network storage 350, or the application repository 360. In particular, when virtual desktops are running, e.g., the user's desktop is running in a datacenter, the Content Abstraction Layer collects the data by sending a message (e.g., via an interprocess communication protocol such as distributed RPC, secure sockets, Java Messaging Server (JMS), http::getpost, RMI, etc.) to a software agent running in the desktop's virtual machine (see box "A" in VM 246*b* in FIG. 2) and a user view is generated. Alternatively, when the disks are in the datacenter but the desktops are "powered off" (not running) or the desktops have been "checked-out" to a client, then either the desktop can be "powered on" if the policies (such as those stored in the Policy Database 330) so define, or the user data disk (i.e., area on a virtual disk designated for user profile data such as what is accessible through "My Documents" in Windows XP Operating System or a virtual disk dedicated to same) can be mounted using a Control VM running on a hypervisor attached to the storage that contains the desired virtual disk, and the data retrieved. In some embodiments, checked-out virtual machines are treated like non-running desktops, because the desktop's virtual machine is (albeit temporarily) not running in the server and may be running or not on a client at any particular point in time. In addition, the request for the user content may be coming from a client device that is different from the client device having the checked-out virtual machine.

A Control VM is a "helper" virtual machine that provides access to virtual disks when the corresponding virtual machine is not running. Also, when the desktops are only replicated in the datacenter and there are not enough computational resources to run the desktops, then, again, Control VMs can be used to mount the corresponding user disks to provide "on-demand access" to user content in these desktops—even though the user cannot run the desktop. The scenarios involving use of a Control VM to mount a virtual disk to retrieve data are described below with respect to FIG. 4. In addition, when accessing data from network storage, the data may be fetched directly from the external storage. This scenario is described below with respect to FIG. 5. Once the data is obtained, if desired, the Content Abstraction Layer generates a view for display on a client device.

In general, a Control VM can use two different mechanisms to access the data stored on a virtual disk: namely, it can (a) mount a disk or (b) use network access to the datastore that stores the data. As used herein, a datastore is an abstraction for a storage volume that is used to store virtual machines. The virtual disks are stored on storage devices, such as locally attached disks, networked disk arrays, and network-attached storage (NAS) filers. Virtual Machines are typically provisioned on datastores using a VMMS (such as VMMS 230 of FIG. 2). Fibre Channel SAN arrays, iSCSI SAN arrays, and NAS (network-attached storage) arrays are widely used storage technologies to store virtual machines. Sharing the storage arrays among groups of servers via SANs allows aggregation of the storage resources and provides more flexibility in provisioning resources to virtual machines. Datastores hide the idiosyncrasies of various storage options and provide a uniform model for applications using the VMMS APIs. In one embodiment, datastores may use either an VMFS or NFS based file system.

Mechanism (a) for accessing the data relies on the VMMS to add the virtual disk to the Control VM's set of devices. This can happen before the Control VM is powered on or during its running operation. Agent software running inside the Control VM (as a portion or all of the Guest System Software resident in a VM) then triggers a discovery of the new device through its guest operating system (e.g., by doing a device rescan), and mounts the disk to a logical mount point (e.g., a drive letter or name like /vmware/user/username). Details of one embodiment for discovering and mounting the new device are described further below with respect to FIG. 9. In this case, a Windows or Linux instance (i.e., a virtual machine running Windows or Linux) can be used as the Control VM and, since access is being mediated by a hypervisor, any storage backend that is supported by the hypervisor will be accessible from within the Control VM. Note that the Control VM instance needs to run on a hypervisor instance that has access to the storage that is hosting the target virtual disk. In different embodiments one or more hypervisor instances may access the datastore where the target virtual disk is stored.

Mechanism (b) relies on the support for network file protocols such as NFS in modern operating systems in order to access the datastore that is hosting the target virtual disk. Using this mechanism, the Control VM can access storage that is not necessarily accessible to its particular hypervisor instance, without the need to instantiate an additional Control VM on a different hypervisor that does have access. Once the datastore is accessible from within the Control VM, the target virtual disk can be mounted and exposed to the guest operation system and used to retrieve data. In some embodiments, the agent software runs the equivalent of a mini-web server that provides a simple API interface (such as a REST interface or other web server supported API) for common operations useful to generate the client view. For example, it may provide primitives to list a directory, list files in an input directory, download/upload of files, etc. This web service can be called by, for example, the Content Abstraction Layer of an EVDM Server, to retrieve the requested user data.

Figure 4:
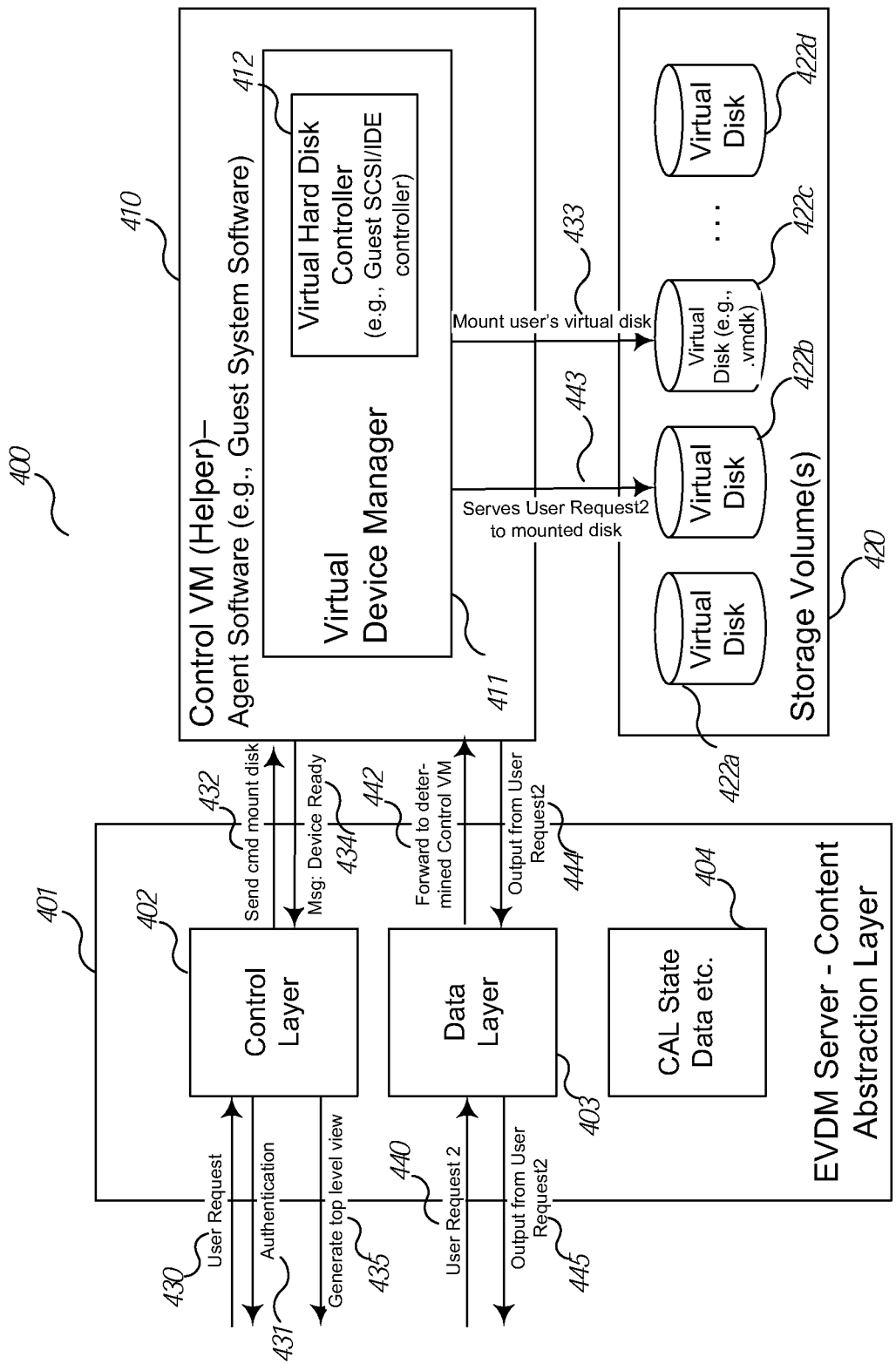
FIG. 4 is an example block diagram of an example Control VM operating with an example Enhanced Virtual Desktop Management Server to provide content from non-running Virtual Machines.

FIG. 4 is an example block diagram of an example Control VM operating with an example Enhanced Virtual Desktop Management Server to provide content from non-running Virtual Machines. As mentioned above, in one embodiment, these include virtual machines that are not running in the datacenter—even if they are running elsewhere, for example, on a client machine. As shown here, the Content Abstraction Layer 401 of an Enhanced VDM server contains a Control Layer 402, a Data Layer 403, and CAL State Data 404. The Control VM 410 contains a (Virtual) Device Manager 411 which communicates with a Virtual Hard Disk Controller 412 (here a Guest SCSI/IDE Controller) to talk to one or more virtual disks 422*a*-422*d*, for example in ".vmdk" format of a VMware virtual machine or a ".vhd" format of a Mircosoft HyperV virtual machine). The Virtual Disks 422*a*-422*d* are stored in one or more storage volumes 420 as discussed above.

In event 430, a user request (through the Profile API, for example, as initiated by a web browser or $3^{rd}$ party application) is made to the Control Layer 402, for example to request data from a non running desktop. The Control Layer 402 authenticates the user (event 431) and locates the virtual disk containing the requested data. According to one embodiment, mappings between the user and the user data, including the identification of user data disks (virtual disks containing user data) may be stored on a directory server, for example, Directory Server 215 in FIG. 2. In other embodiments, internal and/or enterprise databases containing such information may be maintained. Other embodiments may utilize other methods and other forms of data repositories. In instances where more than one user data disk is available for a user, the user may be requested to select the appropriate disk. In other cases, "root" folder information may be kept to aid in interpreting a request that specifies a network share (i.e., the network share typically specifies sufficient information so that the "root" folder can be identified and hence looked up in the directory server or data repository). (Here, a "root" folder may mean path information to find "My Documents" (or other default document folder) on a drive, or a different folder/directory root.) If required, the Control Layer 402 queries the VMMS to determine which Control VM has access to the corresponding virtual disk (e.g., the user data disk). If the virtual disk, for example, disk 422c, is not yet mounted, the Control Layer 402 sends a control command using the mini-web service to the determined Control VM (here, Control VM 410) to mount the disk (event 432) on a specific datastore 420 (shared or local depending upon the configuration). The determined Control VM 410 uses the Agent Software's Virtual Device Manager component 411 to invoke the Virtual Hard Disk Controller 412 to mount the virtual disk 422c containing the user data (event 433). In some embodiments, this "mounting" is performed by performing a controller (e.g., SCSI) rescan to discover the device and then mount it to a logical mount point. A "device ready for file access" or similar message (event 434) is returned to the Control Layer 402 of the Content Abstraction Layer 401 of the EVDM Server. Optionally a top level user content view is generated (event 435) and returned to the requesting client with a security identifier that the client preferably uses for each subsequent request for data on that mounted disk. For example, initially, the files at the root directory of the virtual disk are returned in order to populate an Explorer type of user interface, i.e., showing a tree-view of the file system with a hierarchical folder structure and a list of files contained by a folder selected in the tree-view (e.g., the "My Documents" folder).

On a subsequent user request (event 440), the user request is validated as before (see event 431) and the request is handled. For example, if user requests a file on a previously mounted disk, the request is forwarded to a (previously) determined Control VM 410 (event 442) using the mini-web service and, in some cases, the previously issued security identifier. The Control VM 410 looks up the mounted user disk, checks for policies that support access to the data, and serves the request (event 443) to access the data. User request output is then returned to the Data Layer 403 of the EVDM Server 401 (event 444) and subsequently to the requesting client (event 445) as before.

In addition to providing an Enhanced Connection Broker in an Enhanced Virtual Desktop Management Server, it is noted that several enhancements are made to other components of virtualization infrastructure to support this "on-demand" access to remote content outside of a virtual desktop. For example, referring to FIG. 2, the Inventory Manager 222 may keep track of the active Control VMs and the user data disks that have been mounted (in some cases as part of mounted virtual disks). In addition, any limitations, for example, a maximum number of outstanding operations, maximum number of virtual disks to be mounted in a single Control VM, etc. may also be managed by the Inventory Manager 222. The Administration Console 221 may allow a Desktop Administrator to define control policies surrounding the accessibility of the data from remote devices. For example, the Administrator can define that some devices, and some data, including virtual applications, may be restricted or accessible based upon the particular device, time of day, read only versus read/write, etc. Virtual applications are traditional applications that are packaged and combined with a runtime engine so that the application runs in a limited environment to impose minimal impact on the operating system, including, for example, sandboxed registry settings and associated data and executable files, but at the same time allowing limited access by the application to operating system resources. An example virtual application are applications such as MICROSOFT OFFICE® that are packaged by ThinApp® software, which is available from VMWARE® of Palo Alto, Calif. ThinApp® is capable of packaging a complete application suite into a single executable file that can be loaded from a local disk drive, or accessed from shared network storage.

The Pool Manager 224 may be modified to track and annotate what content in the pool is available for access through the Profile API. In one embodiment, Agent Software present in each virtual machine obtains annotations (e.g., "hints," or lists of what is accessible) through some form of shared channel, e.g., the Windows registry, shared memory, a configuration/properties file, in-guest database, etc. In such embodiments, information on what content is available for access according to the defined policies are communicated between the Agent Software and the Pool Manager, rather than to interface directly with the Policy Databases in order to respect secure connections. (In other embodiments, the Agent Software may be permitted to access information from the Policy Database information.) Also, as described above the Agent Software is enhanced to support a custom web server (e.g., an embeddable HTTP engine) that starts and stops on a specific port (which is configurable) and handles the request forwarded by the Content Abstraction Layer as a result of an API invocation on behalf of a client device. The web server also provides meta-data and bulk file copy access to the Enhanced Connection Broker through a secure control protocol (see FIG. 3).

Since the Enhanced Connection Broker can also provide access to virtual applications (as, for example, one or more executable files) from some sort of shared storage, for example, Application Repository 360 in FIG. 3, some mechanism is included in the virtualized infrastructure to determine whether a requesting user has access to the application or not. One such mechanism can be provided based upon an entitlements mechanism incorporated into a policy database or used with a directory server. Other mechanisms can be supported as well.

In the embodiment described above, that incorporates use of Directory Server 215, or an equivalent data repository, additional mappings for users need to be maintained to support UARC techniques. For example, mappings between users and user data disks, between applications and users, indications of where the user data is stored in the system, for example which VMMS, cluster, datastore, or user data disk. In addition, information may be stored pertaining to location information in network storage, including, for example, identity of an external cloud storage provider, unique resource identifiers (URIs) or a UNC path (e.g., a pathname \\computer name\shared folder\resource) to identify the root (top level) storage bucket for the data, etc.

Underlying these modifications, it is to be understood that the Virtual Machine Management Server, for example, the VMMS 230, and the hypervisor are capable of supporting a control virtual machine to mount and unmount a virtual disk, even when the virtual machine is not running (powered-on). A control VM may be automatically instantiated and launched as needed.

In some embodiments, third party tools that synchronize user data, for example to be backed up or otherwise replicated on external network storage, may be incorporated into a user's virtual machine. In this case, the VMMS, EVDM Server, hypervisors, etc. may be configured to locate this data and the manage policies (or access such policies) associated with the external data. The Control VM is then able to access the data on the network resource and provide it to a requesting user, providing it has some mechanism for determining where the data is stored. In some example embodiments, as mentioned, a Directory Server may be used to identify the root storage bucket for the data.

Figure 5:
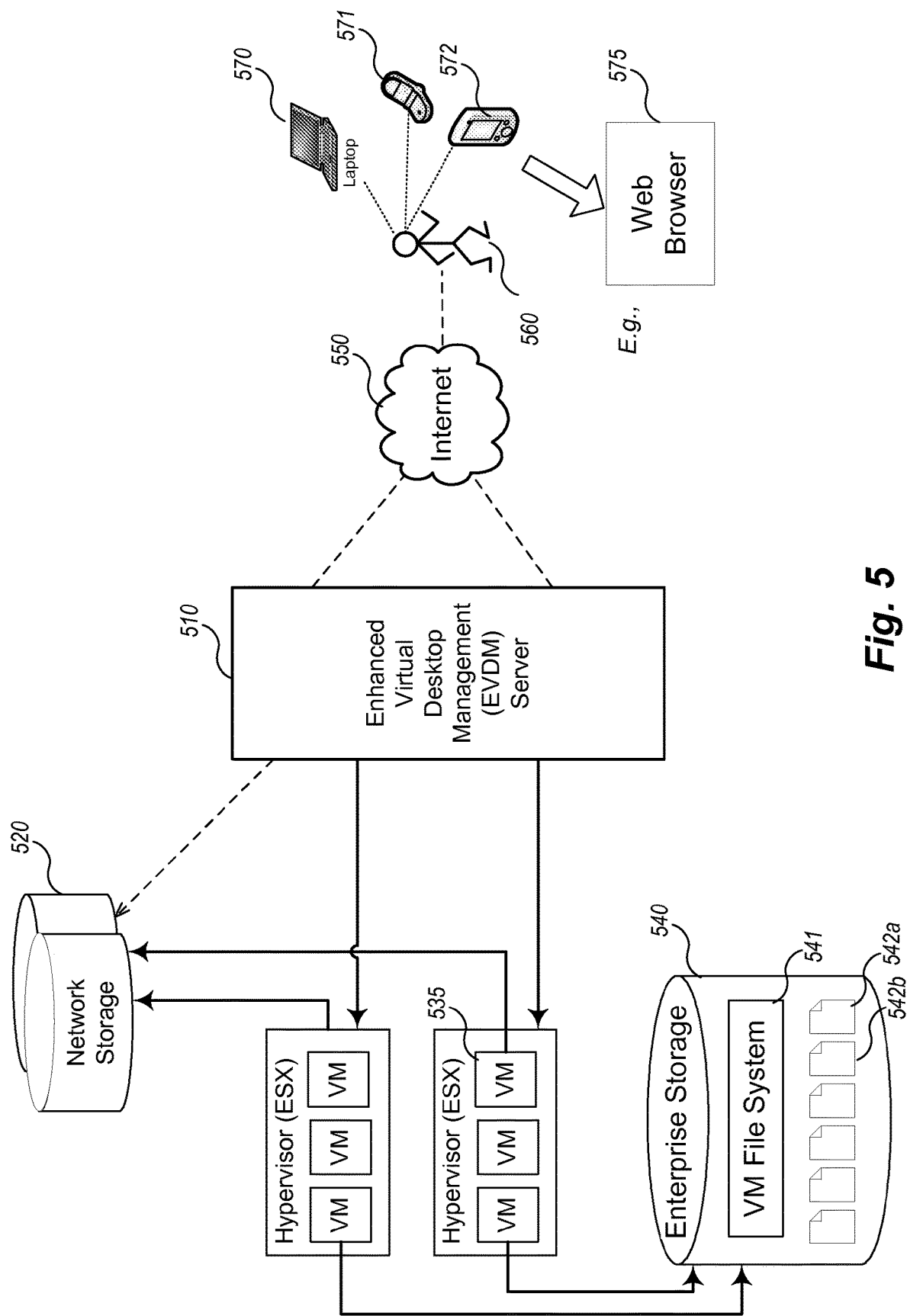
FIG. 5 is an example block diagram of an example Enhanced Virtual Desktop Manager Server operating in a virtualization environment to access content stored on remote storage and enterprise storage.

FIG. 5 is an example block diagram of an example Enhanced Virtual Desktop Manager Server operating in a virtualization environment to access content stored on remote storage and enterprise storage. FIG. 5 also illustrates that a variety of client devices may access data using UARC techniques through a standard web browser type interface, without having to load any software, or through a client application tailored to the device. A user 560 through one of any number of different form factor devices, such as a laptop 570, a smartphone 571, a personal data assistant 572, using, for example, a browser 575, initiates a request through a network (e.g., the Internet 550 or other wide-area or local-area network) to access a file. As described above, the request is in the form of access to the Profile API, which is received by a handler residing in the Enhanced Virtual Desktop Manager Server 510. The EVDM Server 510 determines the location of the source of the requested data (a virtual disk, network share, roaming profile, data repository, etc.) and accordingly, when the requested data is on a virtual disk, which Control VM to use (e.g., if the virtual machine corresponding to the data is not running in the data center), or which Desktop VM to use (e.g., if the desktop corresponding to the data is already running). Control VMs such as VM 535, using Agent Software, are programmed with knowledge of how to access the data from network storage 520, in for example, the case of off-line network storage, or from Enterprise Storage 540, in for example the case where a desktop is not running and the data is stored on a virtual disk. The datastore (e.g., Enterprise Storage device 540, which may be a cluster of devices) may be running its own file system, for example VM File System 541, which contains files, for example 542a and 542b, that each contain an image of a target virtual disk from which the EVDM Server is requesting data. In some embodiments, the EVDM Server 510 is programmed to directly access the network storage 520, for example, using a URI (or Uniform Resource Locator, "URL") or a UNC identifier (e.g., a pathname \\computer name\shared folder\resource) provided by, for example, a directory server. The EVDM Server 510 can download roaming profiles, in the manner, directly from Network Storage 520.

As mentioned with regard to FIGS. 3 and 4, once the target data for a particular API is generated, a view (or content markup of some nature) may be generated by the Enhanced Virtual Desktop Management Server for presentation on a user interface of a client device. In some embodiments, the EVDM Server tracks the form factor of the requesting client and so can mark up the data results so as to be presentable by that form factor device. In other embodiments, a generic (e.g., XML or other tagged) mark up is created so that any customized application can consume and present the data. In one embodiment, the mark up behaves like a web application for delivery through a web browser. Upon user login, the user is presented with a list of files and directories in a topmost folder and, alternatively, a list of applications available for download. Optionally, the user data and applications available to the users could be packaged and presented to end users in the form of a special web based desktop—a "desktop" that can be customized (by wall paper in the browser for example). This web-based desktop could provide similar benefits to a real virtual desktop running in the datacenter. Such a web-based desktop might be appropriate for a range of devices and use cases.

In other embodiments, a custom client application may be written using the API to allow the user access to the content through some form of a shared folder, for example, a "shared briefcase" that integrates operating system specific file exploration functions. For example, a user may start working on a document at work by accessing the desktop running in the datacenter. In the evening, before leaving for the day, the user saves his work and goes home. At home user has installed the desktop custom software that provides the "roaming briefcase" feature. The roaming briefcase file explorer integration connects to the Enhanced Virtual Desktop Management server and discovers the new file. The user can then download the file to his local machine and continue to work on the same document. It should be noted that this system provides merely an alternative to accessing the same file using his virtual desktop in the traditional way; the user can still connect to his virtual machine in the datacenter and work on the document by remotely accessing the running virtual machine using a remote desktop protocol, as described above.

In yet other embodiments, no specific view is generated at all—the view of the data is completely client generated using "raw" results, e.g., WL-formatted results, returned by the API.

Figure 6:
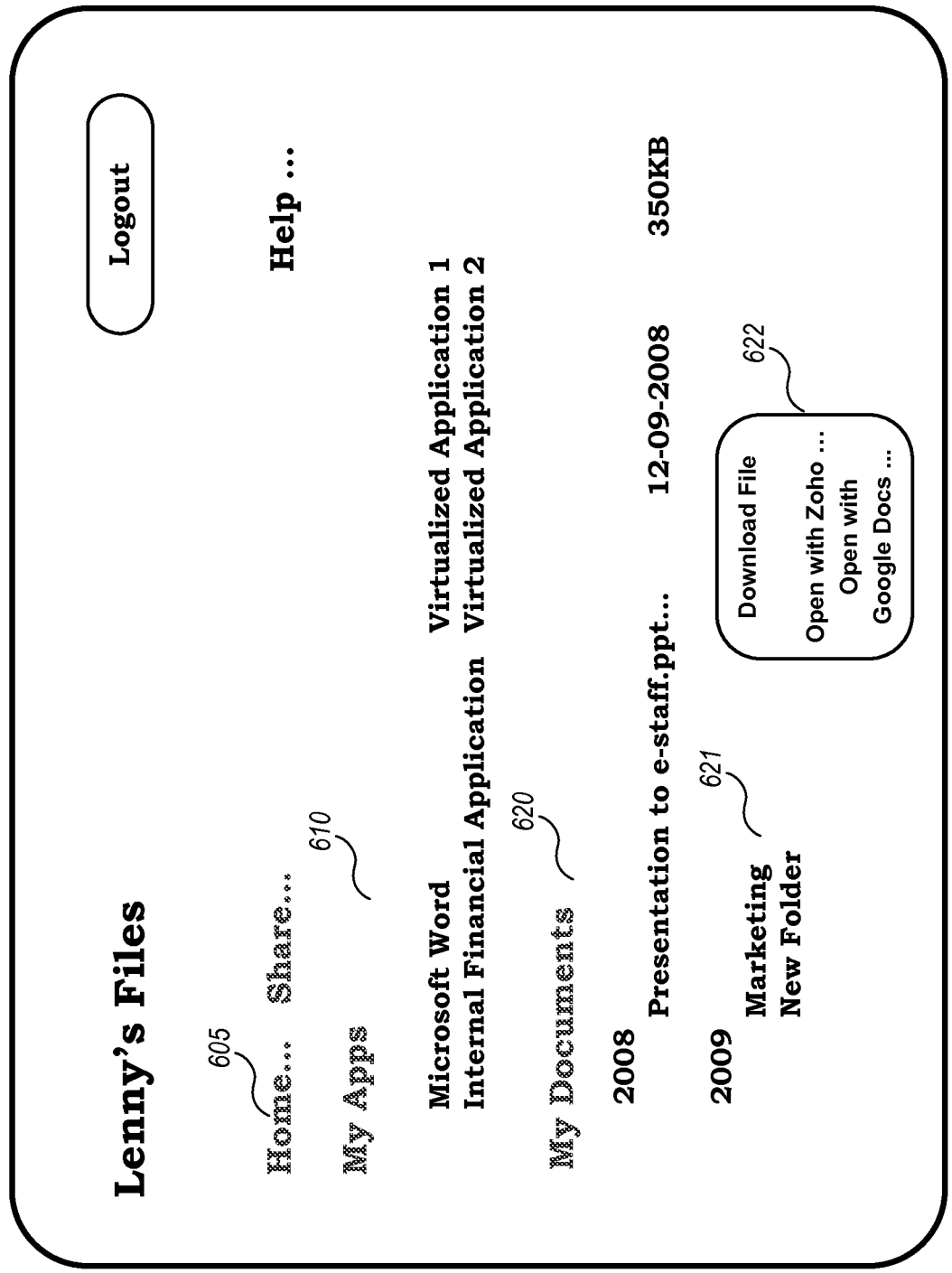
FIG. 6 is an example user interface view created by an example Enhanced Virtual Desktop Management Server for accessing content from an example handheld device without running a virtual desktop.

FIG. 6 is an example user interface view created by an example Enhanced Virtual Desktop Management Server for accessing content from an example handheld device without running a virtual desktop. Such a view may provide an indication of the user's current location information 605 and user profile information such as indications to the user's applications 610 and the user's documents 620. In a typical embodiment, these indications are links (hyperlinks, address pointers, etc.) to the underlying files stored on the computer. When the user wishes to manipulate the content, for example, download a file to a new directory, the user can select the folder 621 and select a command, such as "download file" from a context menu 622 provided by the underlying user interface. In operation, when the "download file" command is selected, the client application invokes the Profile API of the Enhanced Virtual Desktop Management Server, specifying the file name to be retrieved. As can be observed, the interface shown in FIG. 6 is a more simplified than a typical virtual desktop bitmap rendition, and thus appropriate for potentially a larger range of devices.

Figure 7:
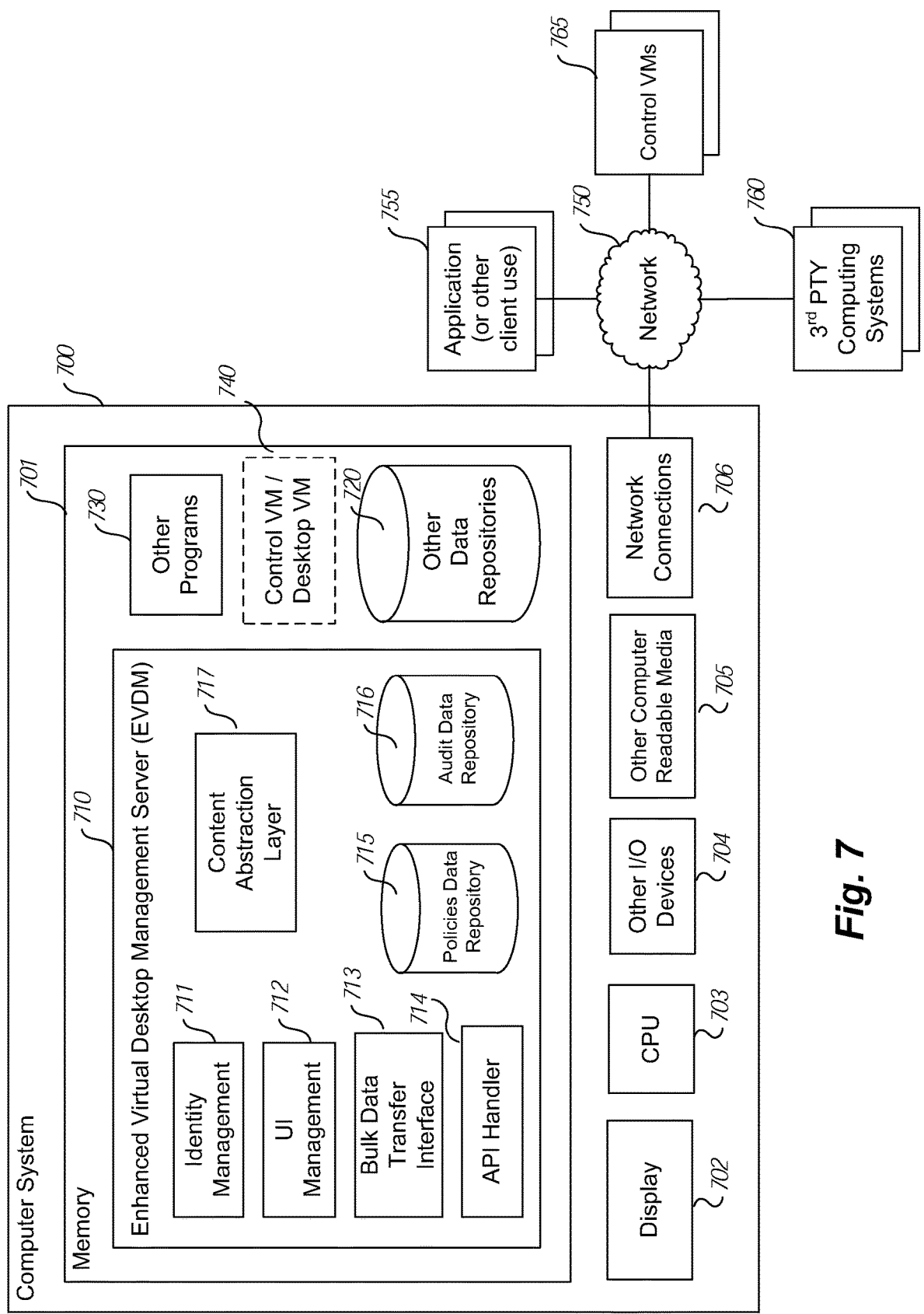
FIG. 7 is an example block diagram of a computing system for practicing example embodiments of a Enhanced Virtual Desktop Management Server.

FIG. 7 is an example block diagram of a computing system for practicing example embodiments of a Enhanced Virtual Desktop Management Server. Note that a general purpose computing system such as a physical computer or virtual machine suitably instructed or a special purpose computing system suitably instructed may be used to implement an EVDM Server. Further, the EVDM Server may be implemented in software, hardware, firmware, or in some combination to achieve the capabilities described herein.

The EVDM server computing system 700 may comprise one or more server and/or client computing systems and may span distributed locations. In addition, each block shown may represent one or more such blocks as appropriate to a specific embodiment or may be combined with other blocks. The EVDM server 710 may be software residing on the computing system 700, or may be synonymous with the server computing system in some embodiments. Moreover, the various blocks of the Enhanced Virtual Desktop Management Server 710 may physically reside on one or more machines, which use standard (e.g., TCP/IP) or proprietary interprocess communication mechanisms to communicate with each other.

In the embodiment shown, EVDM server computing system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The EVDM Server 710 is shown residing in the memory 701. In other embodiments, some portion of the contents, some of, or all of the components of the EVDM Server 710 that implement the logic of the server 700 may be stored on and/or transmitted over the other computer-readable media 705. The components of the Enhanced Virtual Desktop Management Server 710 preferably execute on one or more CPUs 703 and manage the requests for data from heterogeneous sources, as described herein. Other code or programs 730 and potentially other data repositories, such as data repository 720, also reside in the memory 701, and preferably execute on one or more CPUs 703. In addition, one or more Control VMs or Desktop VMs 740 may be executing in the memory 701 of the server computing system 700 depending upon the virtualization infrastructure configuration. Of note, one or more of the components in FIG. 7 may not be present in any specific implementation. For example, some embodiments embedded in other software or hardware may not provide means for user input or display.

In a typical embodiment, the EVDM Server 710 includes one or more Identity Management modules 711, one or more User Interface Management modules 712, one or more Bulk Data Transfer interface modules, API Handler(s) 714, Content Abstraction Layer 717, Policies Data Repository 715, and Audit Data Repository 716. In at least some embodiments, the Identity Management module 712 is provided external to the EVDM Server 710 and is available, potentially, over one or more networks 750. Other and/or different modules may be implemented. In addition, the EVDM Server 710 may interact via a network 750 with application or client code 755 that uses data provided by the API Handler 714 by means of the Content Abstraction Layer 717, one or more third party computing systems or applications 760, and/or one or more Control VMs 765, such as those that access virtual desktop data from virtual disks stored as part of a virtual machine infrastructure as described earlier. Also, of note, the Policies Data Repository 715 and Audit Data Repository 716 may be provided external to the EVDM Server 710 as well, for example in a data base accessible over one or more networks 750. In an example embodiment, components/modules of the EVDM Server 710 are implemented using standard programming techniques.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an EVDM Server implementation.

In addition, programming interfaces to the data stored as part of the EVDM Server 710 (e.g., in the data repositories 716 and 717) can be available by standard means such as through C, C++, C#, and Java APIs; libraries for accessing files, databases, or other data repositories; through scripting languages such as XML; or through Web servers, FTP servers, or other types of servers providing access to stored data. The data repositories 716 and 717 may be implemented as one or more database systems, file systems, or any other method known in the art for storing such information, or any combination of the above, including implementation using distributed computing techniques, stored procedures, or methods attached to "objects" such as "policy objects" etc., although other techniques are equally effective.

Also the example EVDM Server 710 may be implemented in a distributed environment comprising multiple, even heterogeneous, computer systems and networks. For example, in one embodiment, the Identity Management module 711, the API Handler 714, and the Policies Data Repository 715 are all located in physically different computer systems or virtual machines. In another embodiment, various modules of the EVDM Server 710 are hosted each on a separate server machine and may be remotely located from the tables which are stored in the data repositories 715 and 716. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, REST, etc.), RDP, VMC, etc. Other variations are possible. Also, other functionality could be provided by each component/module, or existing functionality could be distributed amongst the components/modules in different ways, yet still achieve the functions of an EVDM Server.

Furthermore, in some embodiments, some or all of the components of the EVDM Server 700 may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable storage medium (e.g., a hard disk; a memory; a network, or other storage; or a portable media article to be read by an appropriate drive or via an appropriate connection). Some or all of the system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

As described in FIGS. 1-6, one of the functions of an Enhanced Virtual Desktop Management Server is to process the Profile API by finding appropriate content and retrieving it from a correct remote location while hiding such details from a requesting application. Also as explained in FIGS. 1, 3 and 4, these functions are the responsibility of an Enhanced Connection Broker implemented by the EVDM Server.

Figure 8A:
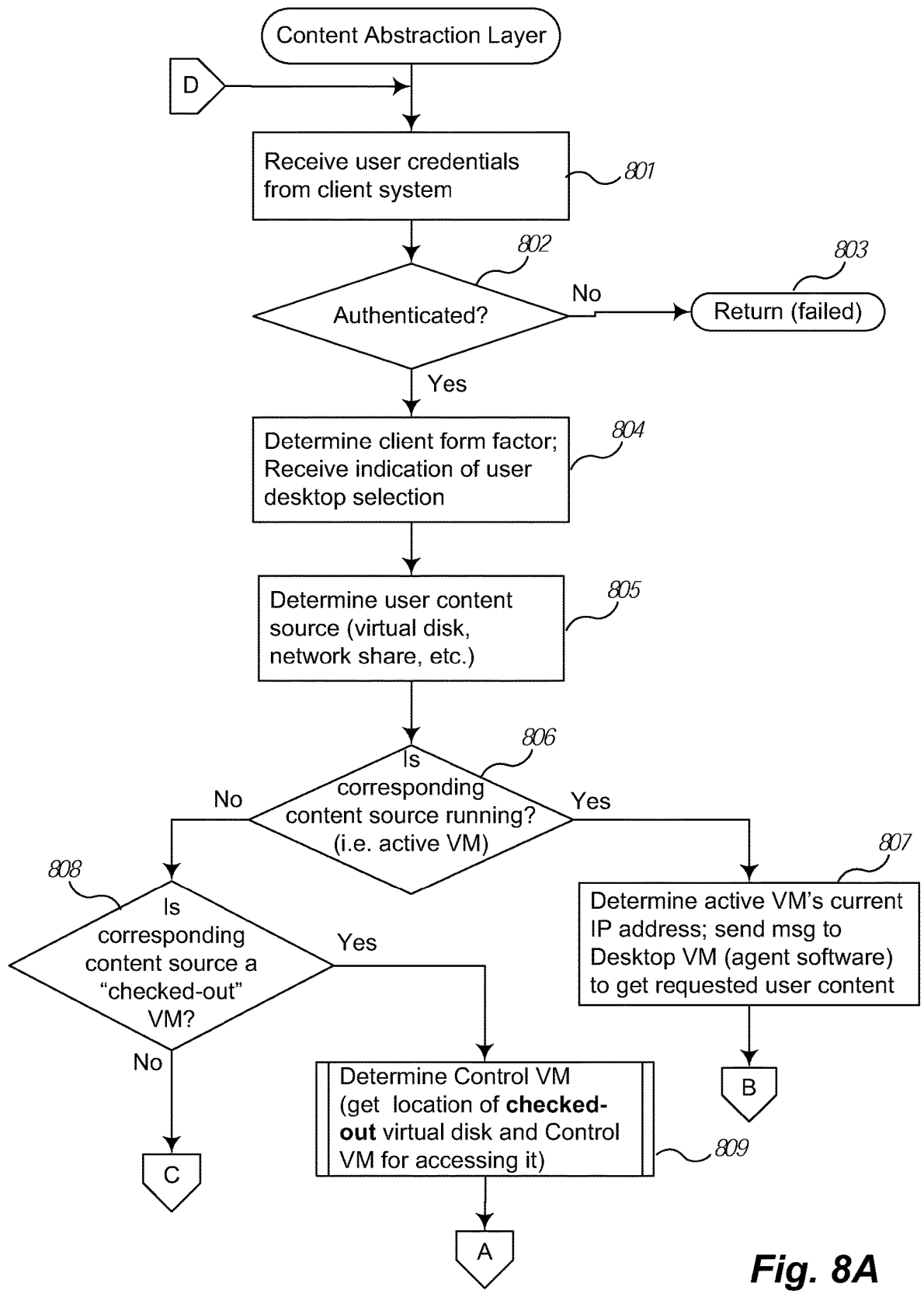
FIGS. 8A and 8B are example flow diagrams of logic executed by an example Content Abstraction Layer of an example embodiment of a Enhanced Connection Broker to deliver uniform access to remote content.
Figure 8B:
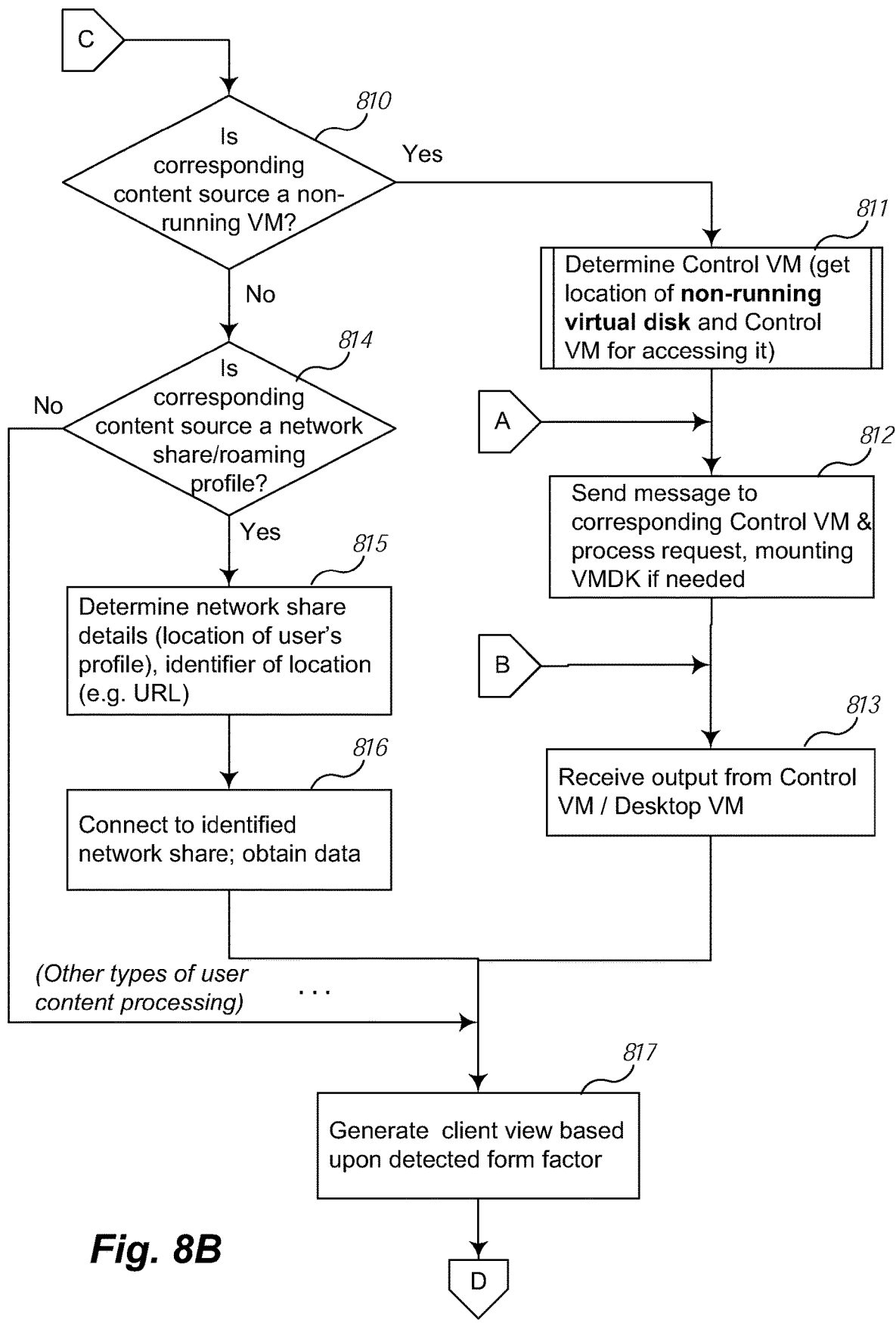

FIGS. 8A and 8B are example flow diagrams of logic executed by an example Content Abstraction Layer of an example embodiment of a Enhanced Connection Broker to deliver uniform access to remote content. Other logic can be provided and in other orders to achieve the functions of the Content Abstraction Layer (CAL) described elsewhere herein. Other components of the EVDM are invoked as needed to process portions of the functionality. In overview, the Content Abstraction Layer determines where the requested content is located, regardless of the type of media upon which it is stored, accesses the content, and provides the content in response to an API request.

Specifically, in block 801, the CAL receives, from an API handler such as API Handler 310 in FIG. 3, the user credentials from the requester client system. In block 802, it determines whether the credentials are authentic (using standard and well-known authentication techniques such as Active Directory, RSS, two-factor authentication, biometric authentication, smart cards, and the like). If the authentication test fails, then the CAL returns a failure error code in block 803; otherwise, continues in block 804. In block 804, the CAL determines the client device form factor (for use, for example, in generating a view in block 817), and receives an indication of the content desired by the user. In block 805, the CAL determines the source for the requested content— for example, whether it is a virtual disk, network share, roaming profile, etc., and continues in block 806.

Blocks 806-817 process the obtaining of the requested data dependent upon the type of the source for the data.

In block 806, the CAL determines whether the corresponding content source was determined to be an active desktop (with a running Desktop VM), and if so, continues in block 807, else continues in block 808. In block 807, the CAL determines the active VM (a Desktop VM) that corresponds to the running desktop (by obtaining, for example, the running VM's current IP address. Several techniques may be used to implement this determination. For example, in some embodiments, a directory service such as Directory Server 215 in FIG. 2, stores mappings from a user, to the user's virtual disks and VMs, and their corresponding IP addresses, which are kept up to date when a connection with desktop is established. (During the connection, the EVDM may maintain the relevant IP addresses in memory.) Once the appropriate running Desktop VM is determined, the CAL sends an appropriate (interprocess) message to the Desktop VM to obtain the requested content. Known message passing techniques are used (for example, secure sockets, http::get post, JMS, RMI, etc.) to send messages to a virtual machine running, for example, in the datacenter. The CAL then continues in block 813 to process the output.

In block 808, the CAL determines instead whether the content source is a "checked out" VM—e.g., a VM running client-side temporarily. If so, then the CAL continues in block 809, otherwise continues in block 810. In block 809, the CAL determines the location of the associated virtual disk and a location of a Control VM that has access to the determined associated virtual disk. One embodiment for making this determination is described below with reference to FIG. 9. In the embodiment illustrated, the determination for locating a Control VM whether the desktop is checked-out to a client machine or not running at all is the same. (Both assume the VM is not running in the datacenter, as, for example, the checked-out desktop may not be running on the same client device as the current request for user data.) In other embodiments, the process for determining a Control VM for the checked-out desktop may differ from that for a non-running desktop. Once the Control VM is determined, the CAL continues in block 812.

In block 810, the CAL determines instead whether the content source is a virtual disk belonging to a virtual desktop that is not running. If so, the CAL continues in block 811, otherwise continues in block 814. In block 811, the CAL determines the location of the associated virtual disk and a location of a Control VM that has access to the determined associated virtual disk. One embodiment for making this determination is described below with reference to FIG. 9. The CAL then continues in block 812.

In block 812, the CAL sends a message to the determined Control VM (corresponding to a checked-out or non-running desktop) and, depending upon the API request, mounts the determined virtual disk if needed to gain access to the content. As described above, depending upon the stored policies and other mappings, the Control VM may instead be "powered-on" to automatically gain access to the requested content by remoting the virtual desktop.

In block 813, the CAL obtains the requested content as output from the Desktop VM or Control VM, and continues in block 817.

In block 814, the CAL determines instead whether the content source corresponds to a network share or roaming profile, and, if so, continues in block 815, otherwise processes any other source of content as required and continues to block 817. In block 815, the CAL determines the network share details, for example, consulting a directory server to find information and an identifier to access the network share (e.g., a URI, a UNC name, etc.). In block 816, the CAL connects to the location using the identifier to the share, and obtains the requested data. The CAL then continues in block 817.

In block 817 the CAL generates a client view (e.g., a user interface) based upon the detected form factor. If, on the other hand, the requesting client code is API based or otherwise indicates, the CAL does not generate a view. In that case, the client code obtains the file and uses a local viewer coded to present the file format. For example, an iphone application that accesses the CAL might employ a special iphone built-in viewer for office documents, or third party software like QuickOffice, to present the file on the phone. For browser based client applications, the documents can optionally be opened using $3^{rd}$ party web-based software such as google docs, zoho, etc.

After processing, assuming the CAL is operating as a daemon process that "sleeps" between actions, the CAL returns to block 801 awaiting invocation by the next user data request.

For subsequent requests to access data from the same virtual disk (user data disk), the CAL will generally follow the same logic pattern as in blocks 801-817, but may provide access to data other than the root data of the user data disk, and will not cause a mount to occur, as the virtual disk is already mounted.

Figure 9:
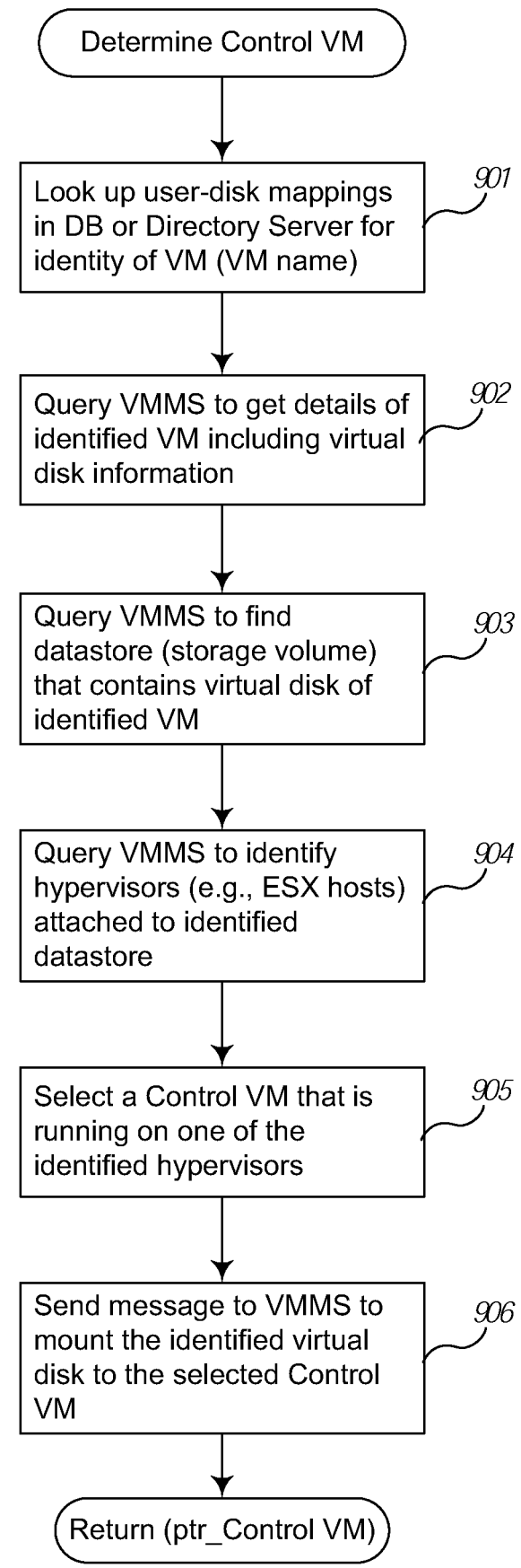
FIG. 9 is an example flow diagram of logic executed by an example Content Abstraction Layer an example embodiment of a Enhanced Connection Broker to determine a Control Virtual Machine to obtain user requested data.

FIG. 9 is an example flow diagram of logic executed by an example Content Abstraction Layer an example embodiment of a Enhanced Connection Broker to determine a Control Virtual Machine to obtain user requested data. As illustrated in FIGS. 8A-8B, this logic is called to find an appropriate Control VM when a user request indicates a request for content on a virtual disk that is not part of a running desktop. In block 901, the CAL determines the identity of the virtual machine that corresponds to the virtual disk containing the requested data. In one embodiment, this is performed by looking up the identification of one or more virtual disks of the associated user in a database kept by a data repository accessible to the CAL or in a directory server as explained above. Each virtual disk is associated with a corresponding virtual machine. In instances where more than one user data disk is available for a user, the user may be requested to select the appropriate disk. In other embodiments, the root folder of each virtual disk is stored and mapped to the user, and the request names a data path that can be reduced to one of these virtual disks. In instances where the CAL cannot automatically resolve the determination of which virtual disk to use, inquiry may be needed.

In block 902, the CAL queries the VMMS to obtain details of the identified virtual machine, including the virtual disk information. In block 903, the CAL queries the VMMS to find the datastore (storage volume(s)) that contains the virtual disk of the identified virtual machine. In block 904, the CAL queries the VMMS to identify one or more hypervisors (e.g., ESX hosts in a VMware virtualization infrastructure) that has access to the identified datastore. In block 905, the CAL chooses a Control VM that is running on one of the identified hypervisors. If a Control VM is not already running, an appropriate Control VM is automatically instantiated and an identifier to the instantiated Control VM returned. In block 906, the CAL sends a message to the chosen Control VM to mount the identified virtual disk to the selected Control VM, and returns an indicator to the chosen Control VM.

Note, as described with reference to FIG. 4, when the Control VM receives the message (via its Agent mini-webserver interface), it causes the device controller to do a "rescan" to discover the newly added device. The Control VM can then mount the virtual disk as a logical mounting point such as a logical drive.

Depending upon the virtualization infrastructure incorporated, the CAL, the VMMS, and the EVDM Server may perform different operations to gain access to the virtual disk without running the virtual desktop on the client device.

From the foregoing it will be appreciated that, although specific embodiments have been described herein for purposes of illustration, various modifications may be made without deviating from the spirit and scope of the present disclosure. For example, the methods and systems for performing uniform access to remote content associated with virtual machines discussed herein are applicable to other architectures other than a VMware Inc. architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A system comprising:
    one or more computing devices including one or more memories and one or more computer processors configured to perform operations comprising:
        receiving a client application request from a client device for user data stored in a remote location from the client device;
        determining that the requested user data is stored on a virtual disk belonging to a non-running virtual machine;
        in response to determining that the requested user data is stored on a virtual disk belonging to a non-running virtual machine, determining a control virtual machine running on a particular hypervisor, wherein determining the control virtual machine comprises:
            determining an identity of the virtual machine that corresponds to the virtual disk containing the requested data;
            determining a storage volume that contains the virtual disk of the identified virtual machine;
            identifying one or more hypervisors that manage one or more control virtual machines having access to the identified storage volume; and
            selecting the control virtual machine from a plurality of control virtual machines, wherein the selected control virtual machine is a virtual machine running on one of the one or more hypervisors and is distinct from the virtual machine that corresponds to the virtual disk containing the requested data;
        causing the control virtual machine to access the requested user data including using guest operating system software of the control virtual machine to initiate a discovery process to identify the virtual disk as a newly added device and to cause a virtual device manager component of the control virtual machine to invoke a virtual hard disk controller to mount the virtual disk containing the requested data; and
        providing the requested user data.

2. The system of claim 1, wherein determining the identity of the virtual machine includes looking up an identification of one or more virtual disks of an associated user.

3. The system of claim 2, wherein in response to determining that there is more than one virtual disk available to the user, requesting a user selection of an appropriate virtual disk.

4. The system of claim 2, wherein the request for user data includes a data path and using the data path to determine the particular virtual disk associated with the user.

5. The system of claim 1, wherein selecting the control virtual machine includes instantiating a new control virtual machine in response to determining that a control virtual machine is not running on the identified one or more hypervisors.

6. The system of claim 1, wherein causing the control virtual machine to access the requested user data includes mounting the virtual disk to the selected control virtual machine.

7. The system of claim 1, wherein causing the control virtual machine to access the requested user data includes powering on the control virtual machine to gain access to the requested data.

8. A method comprising:
    receiving a client application request from a client device for user data stored in a remote location from the client device;
    determining that the requested user data is stored on a virtual disk belonging to a non-running virtual machine;
    in response to determining that the requested user data is stored on a virtual disk belonging to a non-running virtual machine, determining a control virtual machine running on a particular hypervisor, wherein determining the control virtual machine comprises:
    determining an identity of the virtual machine that corresponds to the virtual disk containing the requested data;
    determining a storage volume that contains the virtual disk of the identified virtual machine;
    identifying one or more hypervisors that manage one or more control virtual machines having access to the identified storage volume; and
    selecting the control virtual machine from a plurality of control virtual machines, wherein the selected control virtual machine is a virtual machine running on one of the one or more hypervisors and is distinct from the virtual machine that corresponds to the virtual disk containing the requested data;
causing the control virtual machine to access the requested user data including using guest operating system software of the control virtual machine to initiate a discovery process to identify the virtual disk as a newly added device and to cause a virtual device manager component of the control virtual machine to invoke a virtual hard disk controller to mount the virtual disk containing the requested data; and
providing the requested user data.

9. The method of claim 8, wherein determining the identity of the virtual machine includes looking up an identification of one or more virtual disks of an associated user.

10. The method of claim 9, wherein in response to determining that there is more than one virtual disk available to the user, requesting a user selection of an appropriate virtual disk.

11. The method of claim 9, wherein the request for user data includes a data path and using the data path to determine the particular virtual disk associated with the user.

12. The method of claim 8, wherein selecting the control virtual machine includes instantiating a new control virtual machine in response to determining that a control virtual machine is not running on the identified one or more hypervisors.

13. The method of claim 8, wherein causing the control virtual machine to access the requested user data includes mounting the virtual disk to the selected control virtual machine.

14. The method of claim 8, wherein causing the control virtual machine to access the requested user data includes powering on the control virtual machine to gain access to the requested data.

15. A non-transitory computer-readable storage medium containing instructions that control a computer processor in a computing system to perform a method comprising:
    receiving a client application request from a client device for user data stored in a remote location from the client device;
    determining that the requested user data is stored on a virtual disk belonging to a non-running virtual machine;
    in response to determining that the requested user data is stored on a virtual disk belonging to a non-running virtual machine, determining a control virtual machine running on a particular hypervisor, wherein determining the control virtual machine comprises:
        determining an identity of the virtual machine that corresponds to the virtual disk containing the requested data;
        determining a storage volume that contains the virtual disk of the identified virtual machine;
        identifying one or more hypervisors that manage one or more control virtual machines having access to the identified storage volume; and
        selecting the control virtual machine from a plurality of control virtual machines, wherein the selected control virtual machine is a virtual machine running on one of the one or more hypervisors and is distinct from the virtual machine that corresponds to the virtual disk containing the requested data;
    causing the control virtual machine to access the requested user data including using guest operating system software of the control virtual machine to initiate a discovery process to identify the virtual disk as a newly added device and to cause a virtual device manager component of the control virtual machine to invoke a virtual hard disk controller to mount the virtual disk containing the requested data; and
    providing the requested user data.

16. The non-transitory computer-readable storage medium of claim 15, wherein determining the identity of the virtual machine includes looking up an identification of one or more virtual disks of an associated user.

17. The non-transitory computer-readable storage medium of claim 16, wherein in response to determining that there is more than one virtual disk available to the user, requesting a user selection of an appropriate virtual disk.

18. The non-transitory computer-readable storage medium of claim 16, wherein the request for user data includes a data path and using the data path to determine the particular virtual disk associated with the user.

19. The non-transitory computer-readable storage medium of claim 15, wherein selecting the control virtual machine includes instantiating a new control virtual machine in response to determining that a control virtual machine is not running on the identified one or more hypervisors.

20. The non-transitory computer-readable storage medium of claim 15, wherein causing the control virtual machine to access the requested user data includes mounting the virtual disk to the selected control virtual machine.

* * * * *